United States Patent
Adachi

(10) Patent No.: US 10,859,762 B2
(45) Date of Patent: Dec. 8, 2020

(54) PLANAR LIGHTING DEVICE

(71) Applicant: MINEBEA MITSUMI Inc., Nagano (JP)

(72) Inventor: Kazumasa Adachi, Kitasaku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/561,167

(22) Filed: Sep. 5, 2019

(65) Prior Publication Data

US 2020/0081180 A1    Mar. 12, 2020

(30) Foreign Application Priority Data

Sep. 10, 2018 (JP) .................. 2018-168653
Oct. 9, 2018 (JP) .................. 2018-190788
Dec. 25, 2018 (JP) .................. 2018-241161

(51) Int. Cl.
*F21V 8/00* (2006.01)

(52) U.S. Cl.
CPC ......... *G02B 6/0091* (2013.01); *G02B 6/0068* (2013.01)

(58) Field of Classification Search
CPC ... G02B 6/0031; G02B 6/0068; G02B 6/0091
See application file for complete search history.

(56) References Cited

U.S. PATENT DOCUMENTS

| 8,118,465 | B2* | 2/2012 | Kunimochi | G02B 6/0046 |
| | | | | 362/612 |
| 8,894,264 | B2* | 11/2014 | Takada | G02B 6/0088 |
| | | | | 362/606 |
| 9,158,056 | B2* | 10/2015 | Takada | G02B 6/0068 |
| 2014/0036541 | A1 | 2/2014 | Takada et al. | |
| 2015/0241625 | A1* | 8/2015 | Kim | G02F 1/133553 |
| | | | | 349/58 |
| 2016/0231496 | A1 | 8/2016 | Song et al. | |
| 2016/0306093 | A1* | 10/2016 | Huang | G02B 6/009 |

FOREIGN PATENT DOCUMENTS

| JP | 2007-059386 A | 3/2007 |
| JP | 2014-032860 A | 2/2014 |
| JP | 2018-006322 A | 1/2018 |

OTHER PUBLICATIONS

Notice of Reasons for Refusal dated Sep. 4, 2020 for corresponding Japanese Application No. 2018-241161 and English translation.

* cited by examiner

*Primary Examiner* — Evan P Dzierzynski
(74) *Attorney, Agent, or Firm* — Pearne & Gordon LLP

(57) ABSTRACT

A planar lighting device according to an embodiment includes a light guide plate, a plurality of light sources, and a strip-shaped member. The light guide plate has a side surface and two main surfaces. One of the two main surfaces emits light entered from the side surface. The light sources face the side surface and are arranged in a longitudinal direction of the side surface and emit light that enters the side surface. The strip-shaped member extends in the longitudinal direction of the side surface and is adhered to a region on at least one of the two main surfaces closer to the light sources. The strip-shaped member includes non-adhesive portions disposed at positions facing regions of the at least one of the two main surfaces in front of the light sources. The non-adhesive portions do not adhere to the light guide plate.

20 Claims, 9 Drawing Sheets

PLANAR LIGHTING DEVICE

CROSS-REFERENCE TO RELATED APPLICATION(S)

The present application claims priority to and incorporates by reference the entire contents of Japanese Patent Application No. 2018-168653 filed in Japan on Sep. 10, 2018, Japanese Patent Application No. 2018-190788 filed in Japan on Oct. 9, 2018 and Japanese Patent Application No. 2018-241161 filed in Japan on Dec. 25, 2018.

BACKGROUND OF THE INVENTION

1. Field of the Invention

The present invention relates to a planar lighting device.

2. Description of the Related Art

Planar lighting devices including top-view light emitting diodes (LEDs) or side-view LEDs have been known. These LEDs are disposed to face a light-incident surface of a light guide plate in the planar lighting devices. Related art is described in, for example, Japanese Laid-open Patent Publication No. 2018-006322.

Such a conventional planar lighting device includes an adhesive tape adhered to a region closer to LEDs on one of two light-emitting main surfaces of the light guide plate. The light-emitting main surface emits light from the LEDs and the emitted light enters from the side surface of the light guide plate. If an adhesive layer of the adhesive tape has a refractive index close to that of the light guide plate, part of light from the LEDs exits from one of the main surfaces of the light guide plate to the adhesive layer, resulting in a lower brightness of the planar lighting device. The same is true when the adhesive tape is adhered to the other surface of the two main surfaces of the light guide plate.

SUMMARY OF THE INVENTION

A planar lighting device according to one embodiment of the present invention includes a light guide plate, a plurality of light sources, and a strip-shaped member. The light guide plate has a side surface and two main surfaces. One of the two main surfaces emits light entered from the side surface. The light sources face the side surface and are arranged in a longitudinal direction of the side surface and emit light that enters the side surface. The strip-shaped member extends in the longitudinal direction of the side surface and is adhered to a region on at least one of the two main surfaces closer to the light sources. The strip-shaped member includes non-adhesive portions disposed at positions facing regions of the at least one of the two main surfaces in front of the light sources. The non-adhesive portions do not adhere to the light guide plate.

DETAILED DESCRIPTION OF THE PREFERRED EMBODIMENT

The following describes a planar lighting device according to an embodiment of the present invention with reference to the accompanying drawings. The embodiment described below is not intended to limit the applications of the planer lighting device. The accompanying drawings are illustrated schematically and thus it should be noted that the relation between dimensions of components or the dimensional ratio of one component to another may differ from the actual ones. The dimensional relations or ratios may vary between the accompanying drawings. For ease of discussion, some drawings include a three-dimensional orthogonal coordinate system including a Z-axis, the upward direction of which is a positive direction and the downward direction of which is a negative direction. The three-dimensional orthogonal coordinate system in drawings that illustrate only a part of the structure of the planar lighting device indicates directions of the planar lighting device after assembly.

Outline of Planar Lighting Device

Figure 1:
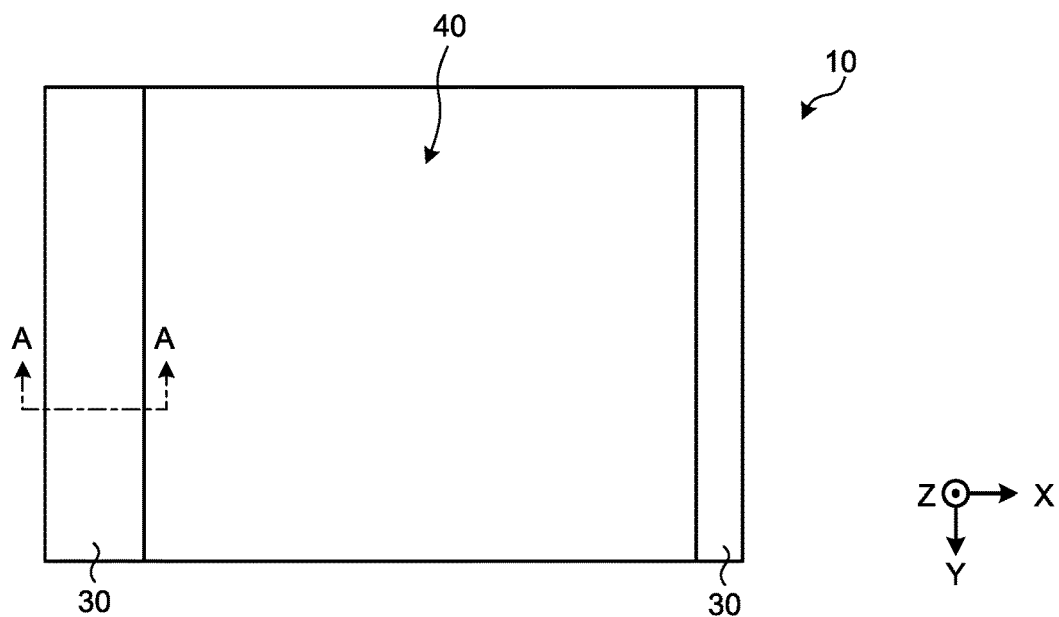
FIG. 1 is a plan view illustrating an example appearance of a planar lighting device according to an embodiment of the present invention.

An outline of a planar lighting device 10 will be described with reference to FIG. 1. FIG. 1 is a plan view illustrating an example appearance of the planar lighting device 10 according to the embodiment. As illustrated in FIG. 1, the planar lighting device 10 according to the embodiment emits light from an effective area 40 that is a light-emitting region not covered with a lightproof sheet 30. In other words, the lightproof sheet 30 defines the effective area 40.

The planar lighting device 10 according to the embodiment is used as a backlight of a liquid crystal display device.

The liquid crystal display device is used in, for example, smartphones or onboard display devices for vehicles.

In FIG. 1, the lightproof sheet 30 on the left-hand side is wider in width than the lightproof sheet 30 on the right-hand side. This is because the lightproof sheet 30 on the right-hand side covers a relatively narrow area in which a flexible printed circuit (FPC) 12 and LEDs 14, which will be described later, are not disposed and the lightproof sheet 30 on the left-hand side covers a relatively wide area in which the FPC 12 and the LEDs 14 are disposed. The width of the lightproof sheet 30 on the left-hand side is, for example, 2.5 mm or smaller.

Detailed Configuration of Planar Lighting Device

Figure 2:
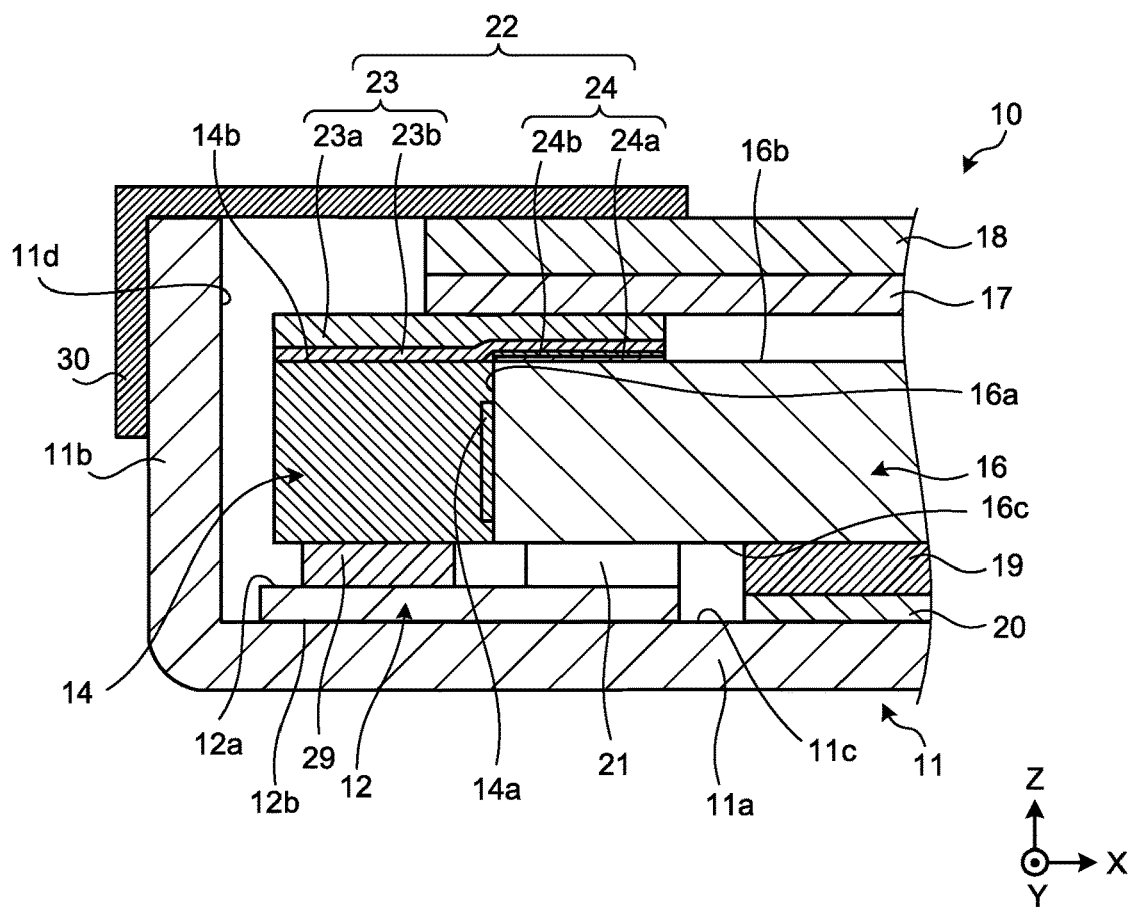
FIG. 2 is an example cross-sectional view taken along line A-A in FIG. 1.

The configuration of the planar lighting device 10 will be described in detail with reference to FIG. 2. FIG. 2 is an example cross-sectional view taken along line A-A in FIG. 1. As illustrated in FIG. 2, the planar lighting device 10 includes a frame 11, the FPC 12, the LEDs 14, a light guide plate 16, a diffusion sheet 17, a prism sheet 18, a reflective sheet 19, a fixing member 20, a fixing member 21, a sticker member 22, and the lightproof sheet 30. The sticker member 22 is an example of a strip-shaped member. The LEDs 14 are mounted on a main surface 12a of the FPC 12 with solder 29.

The frame 11 accommodates the FPC 12, the LEDs 14, the light guide plate 16, the diffusion sheet 17, the prism sheet 18, the reflective sheet 19, the fixing member 20, the fixing member 21, and the sticker member 22. The frame 11 is a sheet-metal frame that is, for example, made of stainless steel for which the rigidity is high. The frame 11 has a bottom portion 11a and a lateral wall portion 11b.

The bottom portion 11a is a portion extending along a main surface 16c of the light guide plate 16, which will be described later. The bottom portion 11a has a bottom surface 11c. The bottom surface 11c supports components such as the LEDs 14 and the light guide plate 16 via, for example, the FPC 12 and the fixing member 20. The lateral wall portion 11b is a portion that integrally stands up from the bottom portion 11a in a direction in which the light guide plate 16 emits light (in the normal line direction of the bottom surface 11c). The lateral wall portion 11b extends along the longitudinal direction of a side surface 16a of the light guide plate 16, which will be described later. The lateral wall portion 11b has a lateral surface 11d.

The FPC 12 has two main surfaces 12a and 12b. A plurality of the LEDs 14 are mounted on the main surface 12a. The FPC 12 is formed with certain wire patterns (not illustrated), through which power is supplied from an external power source (not illustrated) to the LEDs 14 and the LEDs 14 emit light. The FPC 12 is an example of a substrate and may be a rigid substrate.

The LEDs 14 are point light sources. The LEDs 14 are, for example, pseudo-white LEDs including blue LEDs and phosphor. The LEDs 14 generally have a rectangular parallelepiped shape. The LEDs 14 are what is called side-view LEDs having a light-emitting surface 14a orthogonal to a surface on which the FPC 12 is mounted.

The planar lighting device 10 includes a plurality of LEDs 14. The LEDs 14 are disposed in the longitudinal direction (Y-axis direction) of the side surface 16a of the light guide plate 16 with their light-emitting surfaces 14a facing the side surface 16a. Light is emitted from the light-emitting surfaces 14a of the LEDs 14 toward the side surface 16a located in front of the light-emitting surfaces 14a, or in the positive direction of the X-axis. The LEDs 14 emit light that enters the side surface 16a.

The light guide plate 16 is a flat plate member made of transparent material (e.g., polycarbonate resin). The light guide plate 16 has, on the outer surfaces thereof, the side surface 16a and two main surfaces 16b and 16c.

The side surface 16a is a light-incident surface from which light emitted from the light-emitting surfaces 14a of the LEDs 14 enters. The main surface 16b is a light emission surface that emits light entered from the side surface 16a to the outside. The main surface 16c, which may be referred to as a back surface, opposite to the main surface 16b, an optical-path changing patterns containing, for example, a plurality of dots is formed.

The optical-path changing patterns change the directions of light traveling in the light guide plate 16, which in turn allows the main surface 16b to emit light efficiently. The planar lighting device 10 according to the embodiment is, in other words, what is called an edge-lit lighting device.

The diffusion sheet 17 is arranged on the main surface 16b side of the light guide plate 16 to diffuse light emitted from the main surface 16b. Explaining with a specific example, the diffusion sheet 17 is arranged so as to cover the main surface 16b and at least part of upper surfaces 14b of the LEDs 14 and diffuses light emitted from the main surface 16b.

The prism sheet 18 is disposed opposite to the light guide plate 16 with respect to the diffusion sheet 17 to perform light distribution control on the light diffused by the diffusion sheet 17. The prism sheet 18 emits the distribution-controlled light.

The lightproof sheet 30 is arranged so as to cover part of the lateral wall portion 11b side of the prism sheet 18 to prevent light from being emitted from a certain region of the main surface 16b of the light guide plate 16. The lightproof sheet 30 defines the effective area 40 (see FIG. 1) from which light of the planar lighting device 10 is emitted.

The reflective sheet 19 reflects light leaking from the main surface 16c (back surface) opposite to the main surface 16b (light emission surface) of the light guide plate 16 back to the light guide plate 16. The reflective sheet 19 is fixed on the bottom surface 11c of the frame 11 with the fixing member 20 and is disposed between the main surface 16c of the light guide plate 16 and the bottom surface 11c.

The fixing member 20 is, for example, a white double-sided adhesive tape, one surface of which is adhered to part of the reflective sheet 19 and the other surface of which is adhered to the bottom surface 11c. The reflective sheet 19 is fixed to the bottom surface 11c via the fixing member 20 in this manner.

The fixing member 21 is disposed between the main surface 12a of the FPC 12 and the main surface 16c of the light guide plate 16 to fix the light guide plate 16 to the FPC 12. The fixing member 21 is, for example, a double-sided adhesive tape, one surface of which is adhered to at least part of the main surface 12a on the light guide plate 16 side of the FPC 12 and the other surface of which is adhered to at least part of the main surface 16c on the LEDs 14 side of the light guide plate 16.

Since the LEDs 14 are fixed to the FPC 12 with the solder 29, the fixing member 21 fixes the light guide plate 16 to the LEDs 14 via the FPC 12 and the solder 29. The fixing member 21 fixes the light guide plate 16 to the LEDs 14 with the optical axis of the LEDs 14 aligned with the optical axis of the light guide plate 16.

The sticker member 22 adheres to the light guide plate 16. The sticker member 22 is a strip-shaped member adhered to the main surface 16b of the two main surfaces 16b and 16c of the light guide plate 16. The sticker member 22 is disposed over both of the main surface 16b of the light guide plate 16 and the upper surfaces 14b of the LEDs 14. The sticker member 22, if adhering to the LEDs 14, can fix the LEDs 14 to the light guide plate 16 as same as the fixing member 21 with the optical axis of the LEDs 14 aligned with the optical axis of the light guide plate 16. In this case, the sticker member 22 can function as a fixing member that fixes the LEDs 14 to the light guide plate 16.

The sticker member 22 includes an adhesive member 23 that adheres to the main surface 16b of the light guide plate 16 and a plurality of adhesive members 24 that adhere to the adhesive member 23. The adhesive members 24 each have a non-adhesive portion that does not adhere to the light guide plate 16.

The adhesive member 23 is a single-sided adhesive tape having a lightproof substrate 23a and an adhesive layer 23b. The substrate 23a is made of resin such as, for example, polyethylene terephthalate (PET), acryl, polyester, polyimide, or polyvinyl chloride. The substrate 23a is black or white and has a light-shielding propery, but the substrate 23a is not limited to black or white and may be a lightproof substrate of any color. The substrate 23a does not necessarily have a light-shielding property.

The adhesive layer 23b is a sticky layer adhered to part of the main surface 16b on the LEDs 14 side of the light guide plate 16. The adhesive layer 23b is made of, for example, silicone or acryl. The adhesive layer 23b is black, but may be white or transparent. The adhesive member 23 is not limited to a single-sided adhesive tape.

The adhesive members 24 are spaced apart from each other and arranged in the direction in which the LEDs 14 are arranged (Y-axis direction). The adhesive members 24 are disposed between the adhesive member 23 and the light guide plate 16. Each adhesive member 24 is a single-sided adhesive tape having a non-adhesive substrate 24a and an adhesive layer 24b. The thickness of the adhesive members (distance in the Z-axis direction) is, for example, 10 µm or smaller (very thin), and preferably, 5 µm or smaller, and more preferably, 3 to 5 µm. When the adhesive members 24, which are very thin, are adhered to the adhesive member 23, the adhesive member 23 is deformed and, which will be described later, the adhesive layer 23b of the adhesive member 23 can adhere to the main surface 16b of the light guide plate 16. In other words, since the thickness (length in the Z-axis direction) of the adhesive members 24 is small, the adhesive member 23 can absorb, by its deformation, the effect of the adhesive members 24 when the sticker member 22 is adhered to the main surface 16b of the light guide plate 16.

The adhesive layer 24b of each of the adhesive members 24 is, for example, a sticky layer adhesived to the adhesive layer 23b of the adhesive member 23. The substrate 24a is made of resin such as, for example, PET, acryl, polyester, polyimide, or polyvinyl chloride. The substrate 24a is black, but may be transparent or white. The adhesive layer 24b is made of, for example, silicone or acryl. The adhesive layer 24b is black, but may be transparent or white. Instead of the adhesive members 24, the planar lighting device 10 may include members only having the substrate 24a and adhered to the adhesive layer 23b of the adhesive member 23.

Figure 3:
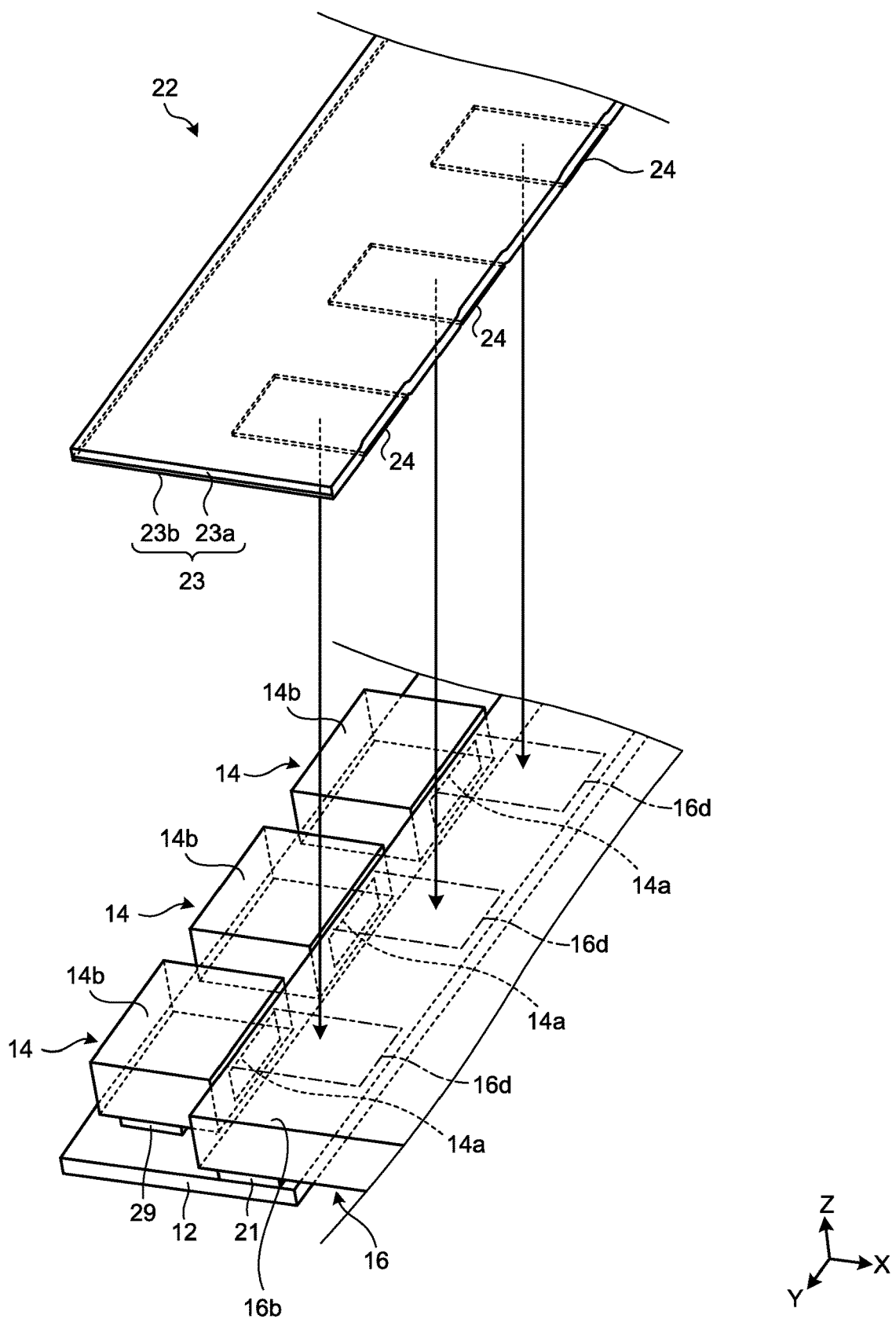
FIG. 3 is a diagram illustrating a relation between LEDs, a fixing member, and a light guide plate according to the embodiment.
Figure 4:
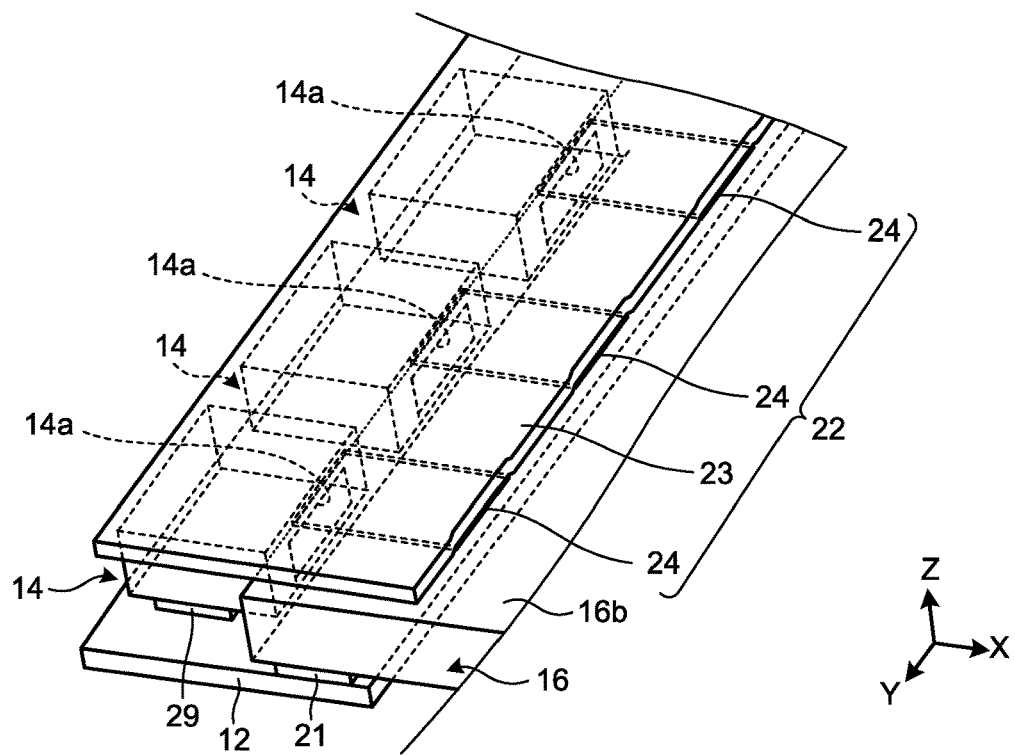
FIG. 4 is a diagram illustrating the relation between the LEDs, a sticker member, and the light guide plate according to the embodiment.
Figure 5:
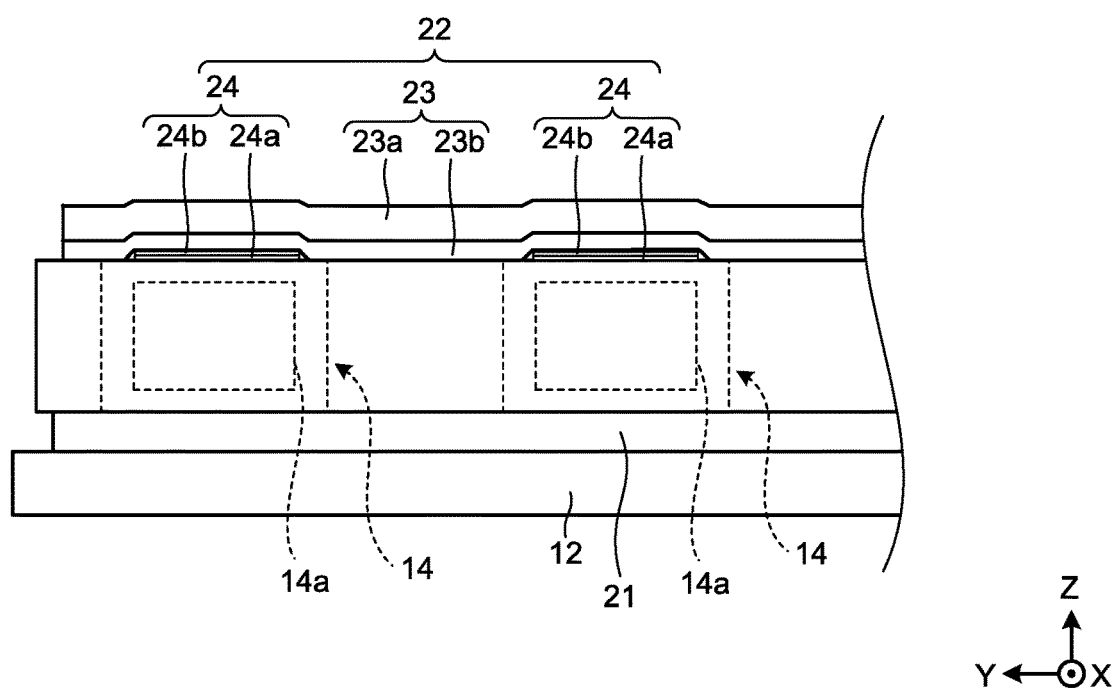
FIG. 5 is a diagram illustrating the relation between the LEDs, the sticker member, and the light guide plate according to the embodiment.

The relation between the LEDs 14, the sticker member 22, and the light guide plate 16 will be described more specifically with reference to FIGS. 3 to 5. FIGS. 3 to 5 are diagrams illustrating the relation between the LEDs 14, the sticker member 22, and the light guide plate 16 according to the embodiment.

As illustrated in FIG. 3, the sticker member 22 includes the adhesive members 24 adhered to the adhesive layer 23b of the adhesive member 23 that are spaced apart from each other and arranged in the direction (Y-axis direction) in which the LEDs 14 are arranged. The adhesive layer 23b of the adhesive member 23 in the sticker member 22 is adhered to the light guide plate 16 and the LEDs 14 with the substrate 24a of the adhesive members 24 being disposed above a corresponding first region 16d of a plurality of first regions 16d on the main surface 16b of the light guide plate 16. The first regions 16d are located on the main surface 16b of the light guide plate 16 in front of the LEDs 14, that is, in the positive direction of the X-axis relative to the LEDs 14. The regions in front of the LEDs 14 on the main surface 16b of the light guide plate 16 have a substantial effect regarding the reduction in brightness when the adhesive layer 23b of the adhesive member 23 is adhered to the regions, and the regions include part of or the whole of region located in front of the corresponding light-emitting surface 14a.

As illustrated in FIGS. 4 and 5, the substrate 24a of the adhesive members 24 faces the regions (first regions 16d in FIG. 3) located in front of the LEDs 14 on the main surface 16b (see FIG. 3) of the light guide plate 16. The substrate 24a of the adhesive members 24 is a non-adhesive member not adhering to the main surface 16b of the light guide plate 16 and thus the substrate 24a is not adhered to the light guide plate 16. This structure provides an air layer between the substrate 24a of the adhesive members 24 and the first regions 16d of the light guide plate 16. The difference between the refractive index of the light guide plate 16 and that of the air layer is significant.

With the difference between the refractive index of the light guide plate 16 and that of the air layer, the light traveling in the light guide plate 16 toward the adhesive members 24 is reflected from the main surface 16b of the light guide plate 16. This prevents emission of light from the main surface 16b of the light guide plate 16, thereby preventing reduction in brightness of the planar lighting device 10.

Figure 6:
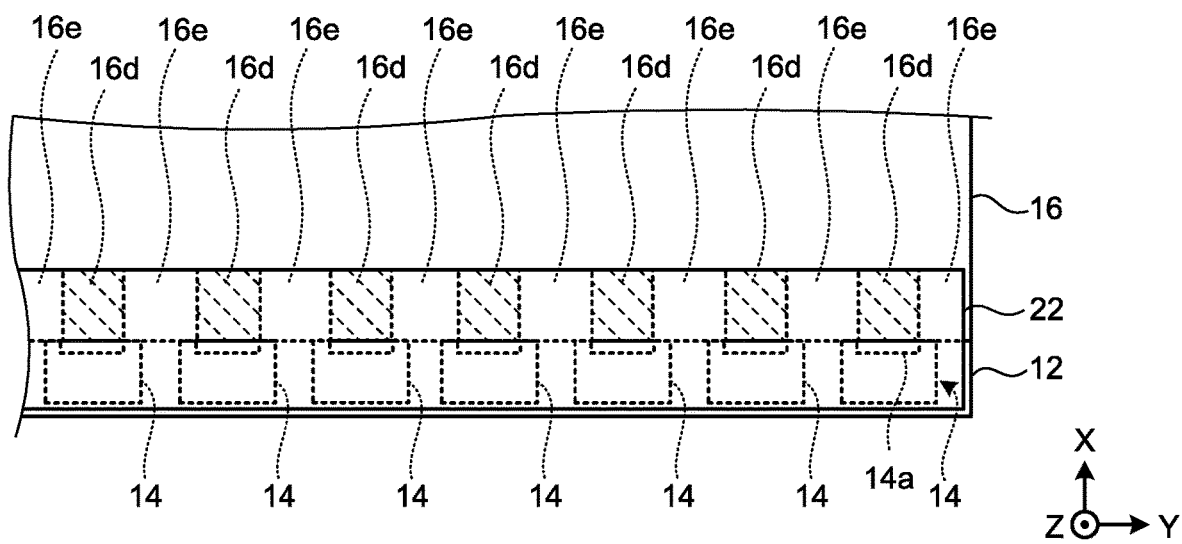
FIG. 6 is a diagram illustrating how the sticker member is adhered to the light guide plate according to the embodiment.

FIG. 6 is a diagram illustrating how the sticker member 22 is adhered to the light guide plate 16 according to the embodiment. A plurality of second regions 16e on the main surface 16b of the light guide plate 16 illustrated in FIG. 6 are adhered to the adhesive layer 23b of the adhesive member 23. The second regions 16e are adjacent to the first regions 16d in the direction (Y-axis direction) in which the LEDs 14 are arranged. Each second region 16e is basically a region between two adjacent first regions 16d, but the second regions 16e include regions that are adjacent only to a single first region 16d. The region between two adjacent first regions 16d is in front of a region between two adjacent LEDs 14, that is, in the positive direction of the X-axis relative to the region between the LEDs 14.

The second regions 16e have substantially no effect or a smaller effect than the first regions 16d regarding reduction in the brightness of the planar lighting device 10 if the adhesive member 23 is adhered to the second regions 16e. Thus, the adhesive layer 23b of the adhesive member 23 is adhered to the second regions 16e.

As illustrated in FIG. 4, the adhesive member 23 is disposed over both of the main surface 16b of the light guide plate 16 and the upper surfaces 14b of the LEDs 14. The adhesive member 23 is black or white and has a light-shielding property. This configuration can prevent light leaking from a gap between the LEDs 14 and the light guide plate 16 or from the package (e.g., the upper surfaces 14b)

of the LEDs 14 in the upward direction (in the positive direction of the Z-axis) from entering the diffusion sheet 17 or the prism sheet 18.

If no lightproof adhesive member 23 is provided and in case light leaks from a gap between the LEDs 14 and the light guide plate 16 or from the package of the LEDs 14 in the upper direction (in the positive direction of the Z-axis), the light leaking from the light guide plate 16 enters the diffusion sheet 17 and the prism sheet 18. Without the lightproof adhesive member 23, the planar lighting device 10 suffers from uneven brightness, which makes it difficult for the planar lighting device 10 to have a narrower (in the transverse width) lightproof sheet 30.

The planar lighting device 10 according to the embodiment includes the lightproof adhesive member 23 disposed over both of the main surface 16b of the light guide plate 16 and the upper surfaces 14b of the LEDs 14. This structure can prevent light that is leaking from a gap between the LEDs 14 and the light guide plate 16 or from the package of the LEDs 14 in the upward direction (in the positive direction of the Z-axis) from entering the diffusion sheet 17 or the prism sheet 18. The planar lighting device 10, therefore, can have a narrower lightproof sheet 30, which can in turn further reduce the frame width.

Suppose that, for example, the planar lighting device 10 has no adhesive member 23 but the diffusion sheet 17 having a lightproof region such as a printed lightproof region. If the diffusion sheet 17 is out of position relative to the light guide plate 16, the lightproof region is displaced, accordingly. The planar lighting device 10 according to the embodiment, however, the lightproof adhesive member 23 is fixed to the light guide plate 16. Compared to such a planar lighting device including the diffusion sheet 17 with a lightproof region, the planar lighting device 10 according to the embodiment achieves a good brightness distribution due to the accurately, or stably, positioned lightproof region. Depending on the required specifications regarding brightness distribution, the adhesive member 23 does not necessarily have a light-shielding property but other members may have a light-shielding property.

As illustrated in FIG. 4, the adhesive member 23 is disposed over both of the main surface 16b of the light guide plate 16 and the upper surfaces 14b of the LEDs 14. This structure can more firmly fix the LEDs 14 to the light guide plate 16. The adhesive member 23 may be configured not to adhere to the upper surfaces 14b of the LEDs 14. If the package of the LEDs 14 is made of a silicone material, the adhesive layer 23b of the adhesive member 23 may be non-adhesive to the LEDs 14. In this case, the package of the LEDs 14 has a substrate (package substrate) at its rear end and the adhesive layer 23b can adhere to the upper surface of such a substrate.

As described above, the light guide plate 16 is fixed to the FPC 12 via the fixing member 21. The fixing member 21 is adhered to each of a plurality of adhering regions of the main surface 16c of the light guide plate 16. The adhering regions are in front of regions between two adjacent, different pairs of LEDs 14, and spaced apart from each other and arranged in the direction in which the LEDs 14 are arranged.

The adhering regions of the main surface 16c of the light guide plate 16 face the second regions 16e on the main surface 16b in the vertical direction. The fixing member 21 is not adhered to regions of the main surface 16c of the light guide plate 16 facing the first regions 16d on the main surface 16b in the vertical direction. With this structure, light traveling toward the fixing member 21 is reflected from the main surface 16c of the light guide plate 16, thereby preventing emission of light from the main surface 16c of the light guide plate 16. This structure can also prevent reduction in brightness of the planar lighting device 10. The fixing member 21 has non-adhesive portions that are disposed at regions of the main surface 16c of the light guide plate 16 facing the first regions 16d on the main surface 16b in the vertical direction. The non-adhesive portions of the fixing member do not adhere to the light guide plate 16. Such non-adhesive portions can be formed by using the substrate 24a of the adhesive members 24 in the same manner as the sticker member 22. The non-adhesive portions of the fixing member 21 can be formed in the same manner as non-adhesive portions of the other types of sticker member 22 to be described below.

The sticker member 22 described above includes the adhesive members 24, which are single-sided adhesive tapes, to form the non-adhesive regions on the adhesive member 23 not adhering to the light guide plate 16, and the substrate 24a of the single-sided adhesive tapes serves as the non-adhesive portion not adhering to the light guide plate 16. However, such non-adhesive portion is not limited to the substrate of a single-sided adhesive tape.

Figure 7:
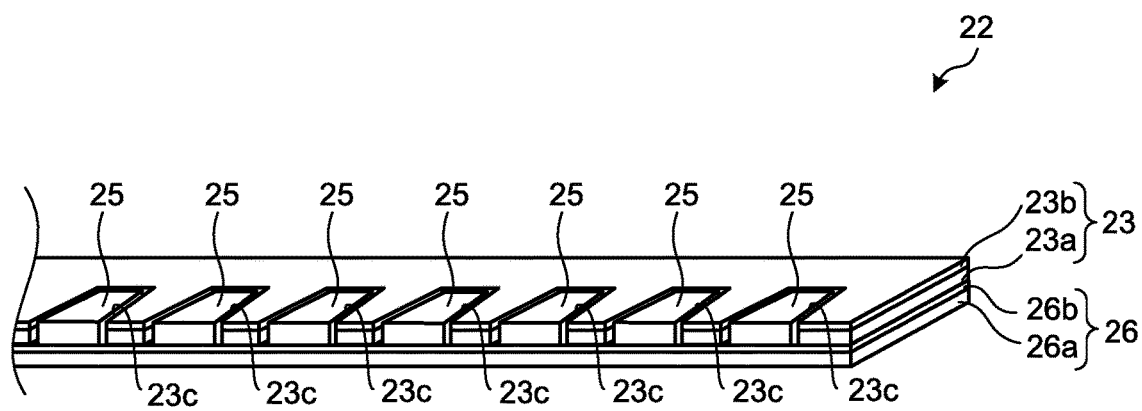
FIG. 7 is a diagram illustrating another example of the sticker member according to the embodiment.

FIG. 7 is a diagram illustrating another example of the sticker member 22 according to the embodiment. The sticker member 22 illustrated in FIG. 7 is a strip-shaped member and includes an adhesive member 23, a plurality of non-adhesive members 25, and an adhesive member 26.

As illustrated in FIG. 7, the adhesive member 23 includes a lightproof substrate 23a and an adhesive layer 23b adhered to the main surface 16b of the light guide plate 16. The adhesive member 23 illustrated in FIG. 7 differs from the strip-shaped adhesive member 23 in FIG. 3 in that it is a comb-shaped member having a plurality of cut-out portions 23c spaced apart from each other in the longitudinal direction of the adhesive member 23.

When the sticker member 22 illustrated in FIG. 7 is adhered to the main surface 16b of the light guide plate 16, the cut-out portions 23c are placed in positions facing the first regions 16d on the main surface 16b illustrated in FIG. 3. At the cut-out portions 23c, non-adhesive members 25 are disposed.

The non-adhesive members 25 function as non-adhesive portions. The non-adhesive members 25 have a shape conform with the shape of the cut-out portions 23c and are made of resin such as, for example, PET, acryl, polyester, polyimide, or polyvinyl chloride. The non-adhesive members 25 are white, but may be black or transparent. In the example in FIG. 7, the shapes of the cut-out portions 23c and the non-adhesive members 25 are trapezoidal, but the shapes are not limited to trapezoidal.

The adhesive member 26 includes a strip-shaped substrate 26a and an adhesive layer 26b adhered to the substrate 23a of the adhesive member 23. The substrate 26a is made of resin such as, for example, PET, acryl, polyester, polyimide, or polyvinyl chloride. The substrate 26a is black or white and has a light-shielding property, but the substrate 26a is not limited to black or white and may be a lightproof substrate of any color. The adhesive layer 26b is a sticky layer made of, for example, silicone or acryl.

As described above, the non-adhesive members 25 are disposed at positions facing the first regions 16d on the main surface 16b illustrated in FIG. 3 when the sticker member 22 illustrated in FIG. 7 is adhered to the main surface 16b of the light guide plate 16. This structure provides an air layer between the non-adhesive members 25 and the first regions 16d of the light guide plate 16, thereby preventing emission of light from the main surface 16b of the light guide plate 16 and preventing reduction in brightness of the planar lighting device 10.

The non-adhesive members 25 are disposed at the cut-out portions 23c of the adhesive member 23 and adhered to the adhesive layer 26b of the adhesive member 26. Without the non-adhesive members 25, the adhesive layer 26b of the adhesive member 26 is exposed from the cut-out portions 23c of the adhesive member 23 and may be adhered to the light guide plate 16. To prevent this situation, the sticker member 22 illustrated in FIG. 7 includes the non-adhesive members 25 at the cut-out portions 23c of the adhesive member 23. This configuration can prevent the sticker member 22 from adhering to the first regions 16d of the light guide plate 16. The non-adhesive members 25 function as spacers that fill the cut-out portions 23c that are the gaps between the comb-shaped portions. The non-adhesive members 25 may be formed by, for example, printing, an operation that will be described below.

Figure 8:
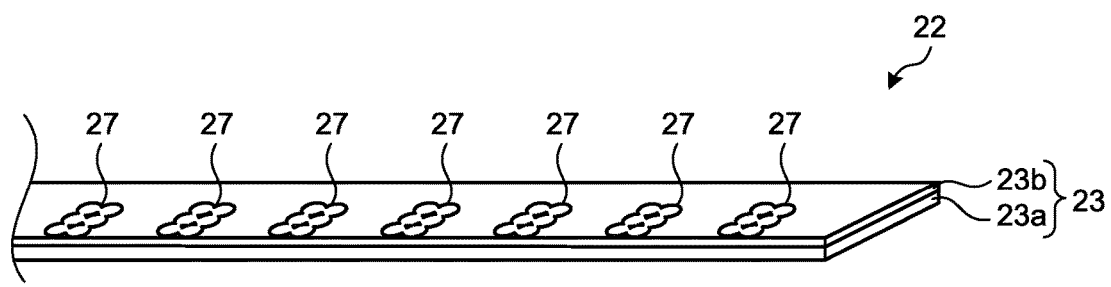
FIG. 8 is a diagram illustrating still another example of the sticker member according to the embodiment.

FIG. 8 is a diagram illustrating still another example of the sticker member 22 according to the embodiment. The sticker member 22 illustrated in FIG. 8 includes an adhesive member 23 and a plurality of non-adhesive members 27 that function as non-adhesive portions.

The adhesive member 23 illustrated in FIG. 8 includes a lightproof strip-shaped substrate 23a and an adhesive layer 23b adhered to the main surface 16b of the light guide plate 16, in the same manner as the adhesive member 23 illustrated in FIG. 3. A plurality of non-adhesive members 27 are disposed on the adhesive layer 23b of the adhesive member 23 and are spaced apart from each other in the longitudinal direction of the adhesive member 23.

The non-adhesive members 27 are made of resin. The non-adhesive members 27 are formed on the adhesive layer 23b of the adhesive member 23 by, for example, printing. In this case, the non-adhesive members 27 are formed by printed ink droplets made of, for example, resin such as, for example, PET, acryl, polyester, polyimide, or polyvinyl chloride and white pigment.

The pigment is not limited to white and the resin included in the ink is not limited to PET, acryl, polyester, polyimide, or polyvinyl chloride. In the example in FIG. 8, the non-adhesive members 27 are formed on the adhesive member 23 by dot printing, but the printing method is not limited to this. The non-adhesive members 27 can be formed on the adhesive member 23 by a method other than printing.

The sticker member 22 illustrated in FIG. 8 is adhered to the main surface 16b of the light guide plate 16 with the non-adhesive members 27 being disposed above the first regions 16d of the light guide plate 16 and the adhesive layer 23b of the adhesive member 23 being adhered to the second regions 16e of the light guide plate 16. This configuration provides an air layer between the non-adhesive members 27 and the first regions 16d of the light guide plate 16, thereby preventing emission of light from the main surface 16b of the light guide plate 16 and preventing reduction in brightness of the planar lighting device 10.

In the description above, the adhesive member 23 is, for example, an adhesive tape, but the adhesive member 23 may be made of any member that can adhere to the light guide plate 16, such as a heat active member or elastomer. For example, the adhesive member 23 may be a heat active adhesive tape that is activated at low temperatures (e.g., 80 to 100° C.). The heat active member may be a thermosetting member or a thermoplastic member.

Figure 9:
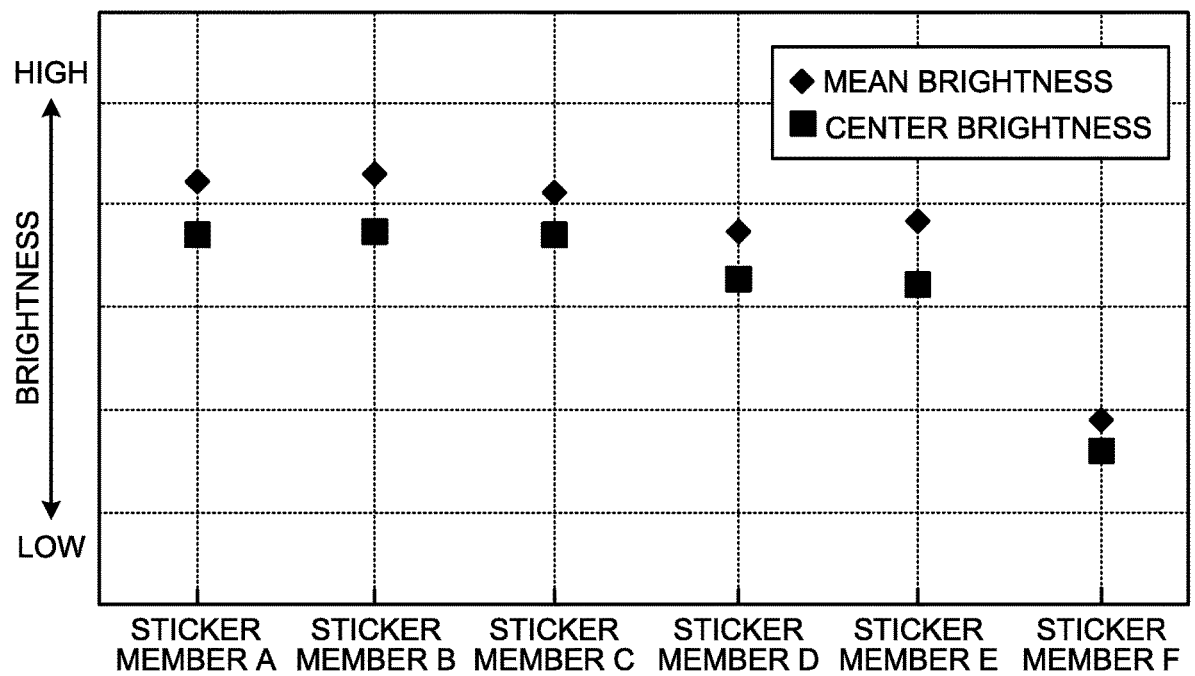
FIG. 9 is a graph illustrating measurement results of mean brightness and center brightness of the planar lighting device measured at each of the sticker members according to the embodiment.

FIG. 9 is a graph illustrating measurement results of mean brightness and center brightness of the planar lighting device 10 including sticker members according to the embodiment. FIG. 9 illustrates, for example, measurement results of mean brightness and center brightness of the planar lighting device 10 including a sticker member A, a sticker member B, a sticker member C, a sticker member D, a sticker member E, and a sticker member F. The mean brightness is the mean of the brightness of light emitted from the effective area 40 of the planar lighting device 10. The center brightness is the brightness of light emitted from the center of the effective area 40 of the planar lighting device 10.

The sticker member A is the sticker member 22 having the structure illustrated in FIG. 3 and includes adhesive members 24 including a transparent substrate 24a and a transparent adhesive layer 24b. The sticker member B is the sticker member 22 having the structure illustrated in FIG. 3 and includes adhesive members 24 including a black substrate 24a and a black adhesive layer 24b. The sticker member C is the sticker member 22 illustrated in FIG. 7 and the sticker member D is the sticker member 22 illustrated in FIG. 8. The sticker member E includes only the adhesive member 23 of the sticker member 22 illustrated in FIG. 7. The sticker member F includes only the strip-shaped adhesive member 23 of the sticker member 22 illustrated in FIG. 3.

As illustrated in FIG. 9, the planar lighting device 10 including the sticker member A, the sticker member B, the sticker member C, or the sticker member D including the non-adhesive portions can significantly increase the mean brightness and the center brightness compared to the planar lighting device 10 including the sticker member F including no non-adhesive portions, and can have the mean brightness and center brightness equal to or higher than those of the planar lighting device 10 including the sticker member E.

Compared to a sticker member 22 without a light-shielding property, the lightproof sticker member 22 can significantly reduce the area of uneven brightness in front of the LEDs 14, which allows the planar lighting device 10 to have a narrower lightproof sheet 30. The planar lighting device 10 including the sticker member A, the sticker member B, the sticker member C, or the sticker member D significantly reduced the area of uneven brightness in front of the LEDs 14 compared to the planar lighting device 10 including the sticker member E (what is called a comb-shaped sticker member disclosed in, for example, Japanese Patent Application Laid-open No. 2005-259374, which is used as a structure of preventing light absorption). Specifically, the planar lighting device 10 including the sticker member A, the sticker member B, the sticker member C, or the sticker member D, compared to the planar lighting device 10 including the sticker member E, can reduce the length of the lightproof sheet 30 from a region above the light-emitting surfaces 14a to an end of the lightproof sheet 30 in the positive direction of the X-axis to about 50 to 60%, which allows the planar lighting device 10 to have a narrower frame.

The sticker member E is a comb-shaped sticker member having the cut-out portions 23c at positions facing the first regions 16d of the light guide plate 16. Providing the cut-out portions 23c can prevent light from being absorbed by the sticker member E. However, the inventors have found that the planar lighting device 10 including the sticker member E suffers from poor brightness distribution due to light leaking from the comb-shaped portions (cut-out portions) and thus from uneven brightness (hot spot) since the planar lighting device 10 has a narrower frame at the side of the light sources, which is a recent requirement by the industry. The planar lighting device 10 including the strip-shaped sticker member F having no non-adhesive portions can prevent uneven brightness but has the problem of light-absorption. In other words, when the planar lighting device 10 includes the strip-shaped sticker member F having no non-adhesive portions, the portions facing the first regions 16d of the light guide plate 16 are adhered to the light guide plate 16 and then light exits from the adhered portions to the outside of the light guide plate 16 and is absorbed in the sticker member F, which reduces brightness as described above. The planar lighting device 10 including the sticker member A, the sticker member B, the sticker member C, or the sticker member D having the non-adhesive portions can prevent light absorption and uneven brightness even if the planar lighting device 10 has a narrower frame (if the width of the lightproof sheet 30 is reduced). The same effect can be obtained when the fixing member 21 disposed opposite to the sticker member 22 relative to the light guide plate 16 has the same non-adhesive portions as those of the sticker member A, the sticker member B, the sticker member C, or the sticker member D disposed at regions of the main surface 16c of the light guide plate 16 facing the first regions 16d in the vertical direction. The planar lighting device 10 can prevent light absorption and uneven brightness by including the fixing member 21 having the same non-adhesive portions as those of the sticker member 22.

Figure 10:
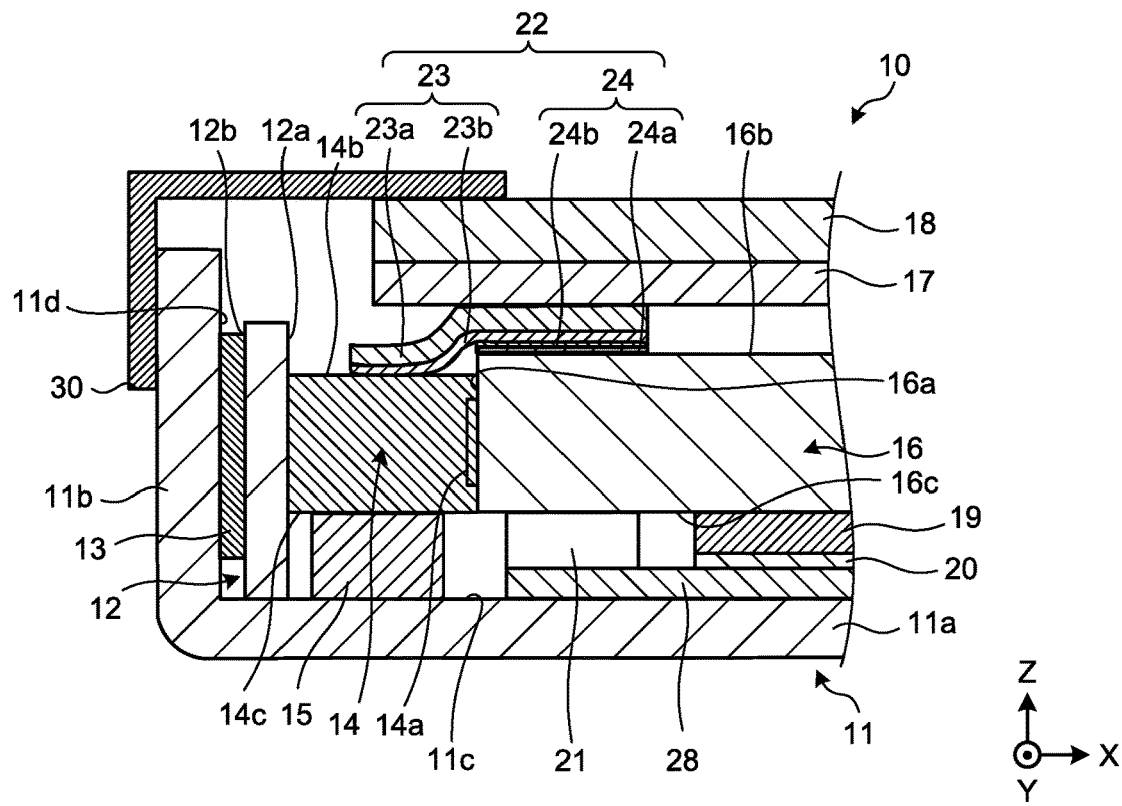
FIG. 10 is another example cross-sectional view taken along line A-A in FIG. 1.
Figure 11:
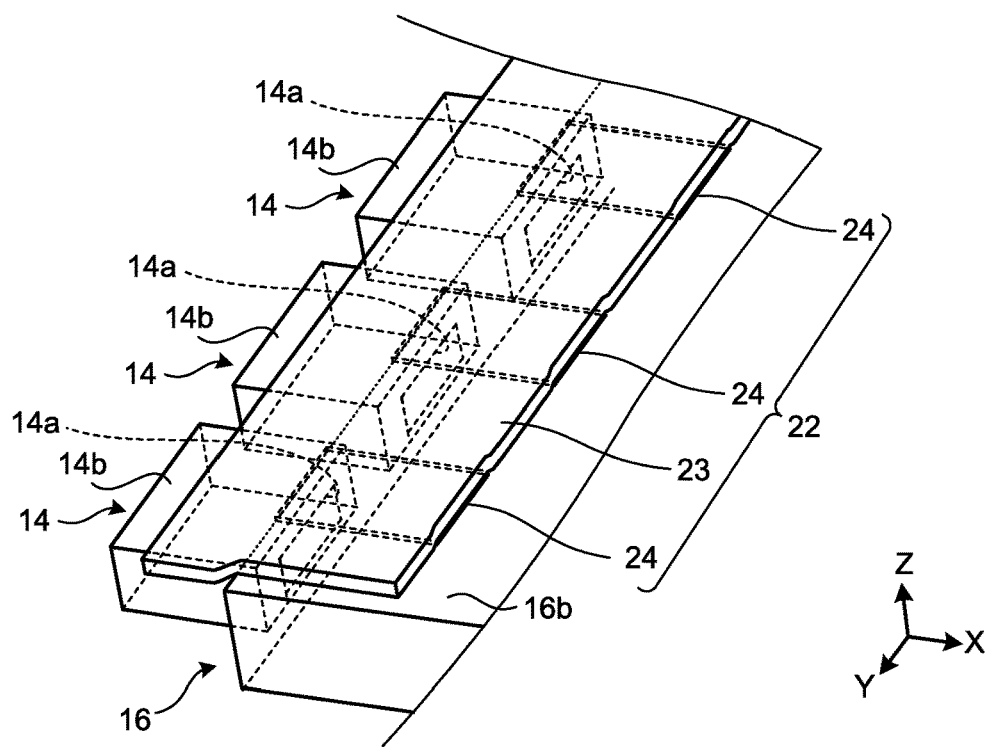
FIG. 11 is a diagram illustrating a relation between the LEDs, a fixing member, and the light guide plate of the planar lighting device in FIG. 10.

The planar lighting device 10 described above includes side-view LEDs, but the planar lighting device 10 may include top-view LEDs. FIG. 10 is another example cross-sectional view taken along line A-A in FIG. 1. FIG. 10 illustrates an example configuration of the planar lighting device 10 illustrated in FIG. 1 including top-view LEDs. FIG. 11 is a diagram illustrating the relation between the LEDs 14, the sticker member 22, and the light guide plate 16 of the planar lighting device 10 in FIG. 10. Components having the same functions as those of the planar lighting device 10 illustrated in FIG. 2 are similarly numbered and explanation thereof is omitted. The following mainly describes components different from those of the planar lighting device 10 illustrated in FIG. 2.

The planar lighting device 10 illustrated in FIG. 10 includes what is called top-view LEDs 14 having the light-emitting surfaces 14a opposite to the surface on which the FPC 12 is mounted. The LEDs 14 are mounted on the main surface 12a of the FPC 12 with solder (not illustrated). As illustrated in FIG. 10, the planar lighting device 10 includes a fixing member 13, a connecting member 15, and a fixing member 28.

The fixing member 13 fixes the FPC 12 to the lateral surface 11d of the frame 11. The fixing member 13 is, for example, a double-sided adhesive tape. One surface of the fixing member 13 is adhered to the main surface 12b of the FPC 12 opposite to the main surface 12a, and the other surface of the fixing member 13 is adhered to the lateral surface 11d, and thus, the FPC 12 is fixed to the lateral surface 11d.

The connecting member 15 is, for example, a single-sided adhesive tape having a sticky layer on one surface. The sticky layer of the connecting member 15 is made of, for example, silicone or acryl and is adhered to at least part of lower surfaces 14c of the LEDs 14 on the bottom surface 11c side. The connecting member 15 is not limited to the single-sided adhesive tape but may be, for example, a double-sided adhesive tape.

The fixing member 28 is, for example, a double-sided adhesive tape having sticky layers on the both surfaces. The sticky layers of the fixing member 28 are made of, for example, silicone or acryl and one sticky layer is adhered to the fixing member 21 and the other sticky layer is adhered to the bottom surface 11c of the frame 11. The light guide plate 16 is fixed to the bottom surface 11c of the frame 11 with the fixing members 21 and 28 with the optical axis of the LEDs 14 aligned with the optical axis of the light guide plate 16.

As illustrated in FIG. 11, the sticker member 22 is adhered to the main surface 16b of the light guide plate 16 and is disposed over both of the main surface 16b of the light guide plate 16 and the upper surfaces 14b of the LEDs 14. The sticker member 22 illustrated in FIG. 11 has the same configuration and functions as those of the sticker members 22 illustrated in, for example, FIGS. 3 to 8 above. Providing the sticker member 22 allows the planar lighting device 10 in FIG. 10 to prevent reduction in brightness and have a narrower frame.

The fixing member 21 may include non-adhesive portions (not illustrated) so that the fixing member 21 will not adhere to the first regions 16d on the main surface 16c of the light guide plate 16. This structure can further prevent reduction in brightness. The non-adhesive portions of the fixing member 21 can be formed in the same manner as the non-adhesive portions of the sticker members 22 described above.

The planar lighting device 10 illustrated in FIG. 10 includes the fixing member 21 adhered to the light guide plate 16 and the connecting member 15 adhered to the LEDs 14, but the planar lighting device 10 may include a fixing member 21 extending over both of the light guide plate 16 and the LEDs 14 and adhered to the light guide plate 16 and the LEDs 14, without including the connecting member 15.

Figure 12:
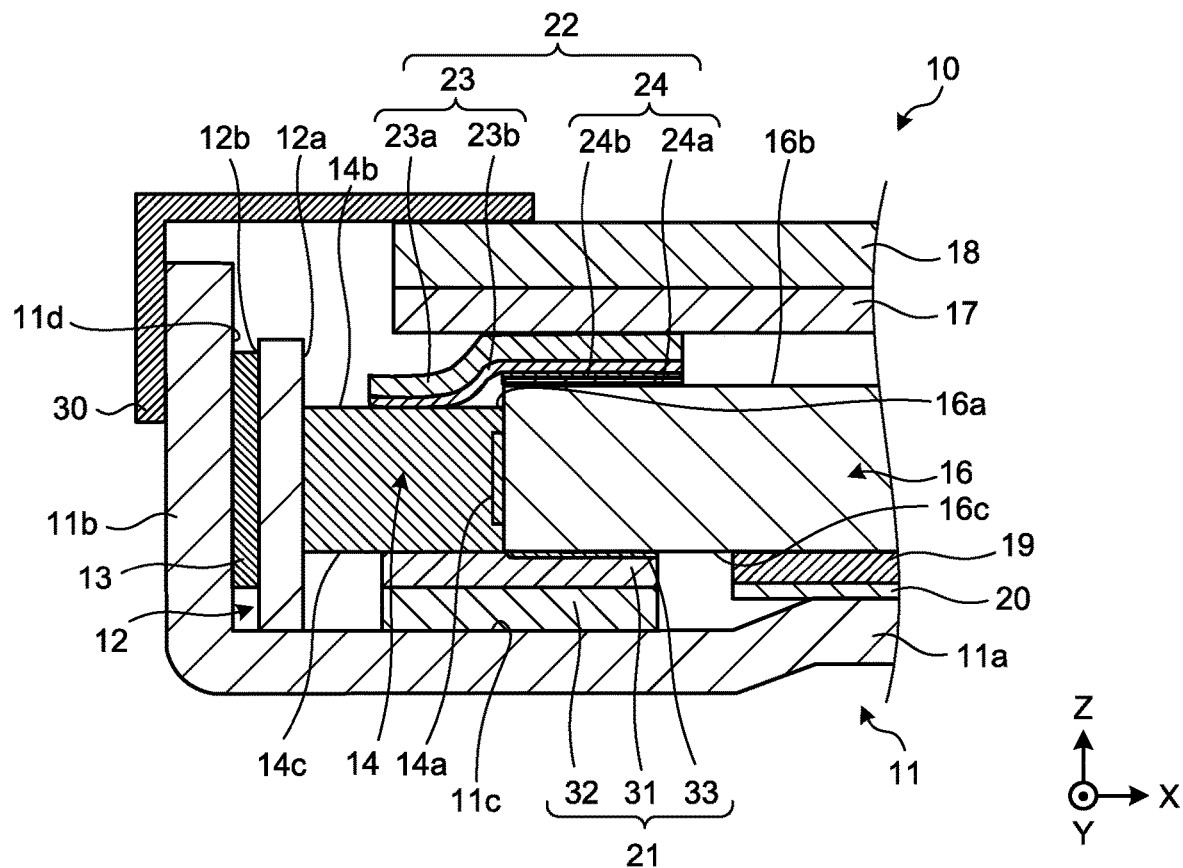
FIG. 12 is still another example cross-sectional view taken along line A-A in FIG. 1.
Figure 13:
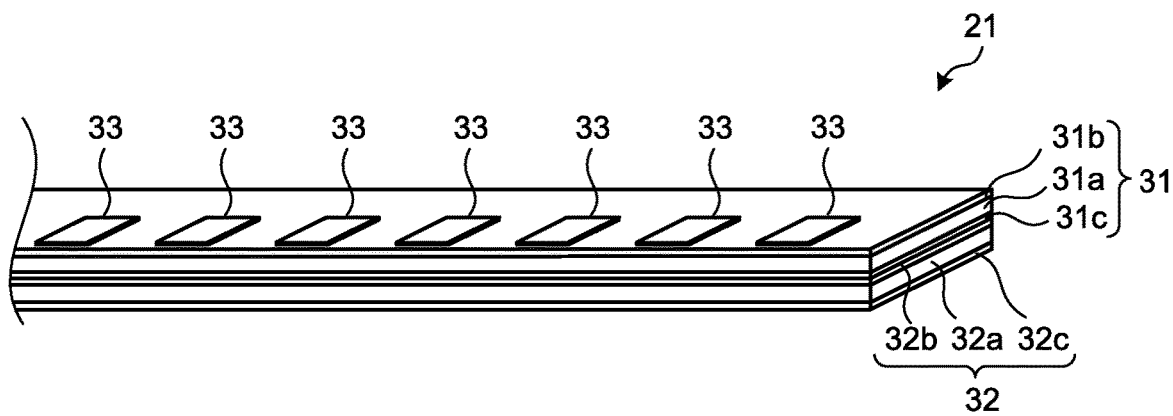
FIG. 13 is a diagram illustrating an example structure of a fixing member in FIG. 12.

FIG. 12 is still another example cross-sectional view taken along line A-A in FIG. 1. FIG. 12 illustrates another example configuration of the planar lighting device 10 illustrated in FIG. 1 including top-view LEDs. FIG. 13 is a diagram illustrating an example structure of the fixing member 21 in FIG. 12. The planar lighting device 10 illustrated in FIG. 12 includes a fixing member 21 extending over both of the main surface 16c of the light guide plate 16 and the lower surfaces 14c of the LEDs 14 and adhered to the main surface 16c of the light guide plate 16 and to the lower surfaces 14c of the LEDs 14, which differs from the planar lighting device 10 illustrated in FIG. 10 that includes the fixing member 21 adhered to the main surface 16c of the light guide plate 16 and includes the connecting member 15 adhered to the lower surfaces 14c of the LEDs 14.

The fixing member 21 illustrated in FIG. 12 includes, for example, an adhesive member 31, an adhesive member 32, and a plurality of non-adhesive members 33 as illustrated in FIG. 13. The adhesive member 31 and the adhesive member 32 are an example of a strip-shaped fixing member body. The adhesive member 31 is a double-sided adhesive tape having a substrate 31a and adhesive layers 31b and 31c. In the same manner, the adhesive member 32 is a double-sided adhesive tape having a substrate 32a and adhesive layers 32b and 32c. The adhesive layer 31c of the adhesive member 31 is adhered to the adhesive layer 32b of the adhesive member 32. The adhesive layer 32c of the adhesive member 32 is adhered to the bottom surface 11c of the frame 11 as illustrated in FIG. 12. The adhesive member 31 and the adhesive member 32 may be, for example, a single-sided adhesive tape. The adhesive member 32 may be omitted.

The substrates 31a and 32a are made of resin such as, for example, PET, acryl, polyester, polyimide, or polyvinyl chloride. The substrates 31a and 32a are lightproof substrates and are, for example, black or white, but may be transparent. The adhesive layers 31b, 31c, 32b, and 32c are made of, for example, silicone or acryl. The adhesive layers 31b, 31c, 32b, and 32c are black or white, but may be transparent.

The non-adhesive members 33 are disposed on the adhesive layer 31b of the adhesive member 31 and are spaced apart from each other in the longitudinal direction of the adhesive member 31. The non-adhesive members 33 are an example of non-adhesive portions not adhering to the main surface 16c of the light guide plate 16. The non-adhesive members 33 are made of resin. The non-adhesive members 33 are formed on the adhesive layer 31b of the adhesive member 31 by, for example, printing. In this case, the non-adhesive members 33 are formed by printed ink droplets made of, for example, resin such as PET, acryl, polyester, polyimide, or polyvinyl chloride and white pigment. The non-adhesive members 33 may be made of a very thin sheet of PET, acryl, polyester, polyimide, or polyvinyl chloride, for example, and formed on the adhesive layer 31b of the adhesive member 31 by a method other than printing.

The fixing member 21 illustrated in FIG. 13 is adhered to the main surface 16c of the light guide plate 16 with the non-adhesive members 33 being disposed at regions of the main surface 16c of the light guide plate 16 facing the first regions 16d and with the adhesive layer 31b of the adhesive member 31 being adhered to the second regions 16e of the light guide plate 16. This configuration provides an air layer between the non-adhesive members 33 and the first regions 16d of the light guide plate 16, thereby preventing emission of light from the main surface 16c of the light guide plate 16 and preventing reduction in brightness of the planar lighting device 10.

The planar lighting device 10 illustrated in FIG. 12 can prevent reduction in brightness and have a narrower frame by including the sticker member 22 in the same manner as the planar lighting device 10 illustrated in FIG. 10, and can further prevent reduction in brightness by including the fixing member 21. The fixing member 21 of the planar lighting device 10 illustrated in FIG. 12 may include non-adhesive portions having the same configuration as that of the sticker members 22 described above instead of including the non-adhesive portions having the configuration in FIG. 13. For example, the fixing member 21 of the planar lighting device 10 illustrated in FIG. 12 may have the same configuration as any of the sticker members 22 illustrated in FIGS. 3, 7, and 8. In this case, the adhesive member 23 or the adhesive member 26 of the sticker member 22 may be made of a double-sided adhesive tape.

The fixing member 21 can prevent reduction in brightness as described in the example above, but the fixing member 21 that prevents reduction in brightness is not limited to this example. The following describes other examples of the fixing member 21 that prevents reduction in brightness with reference to FIGS. 14 to 17.

Figure 14:
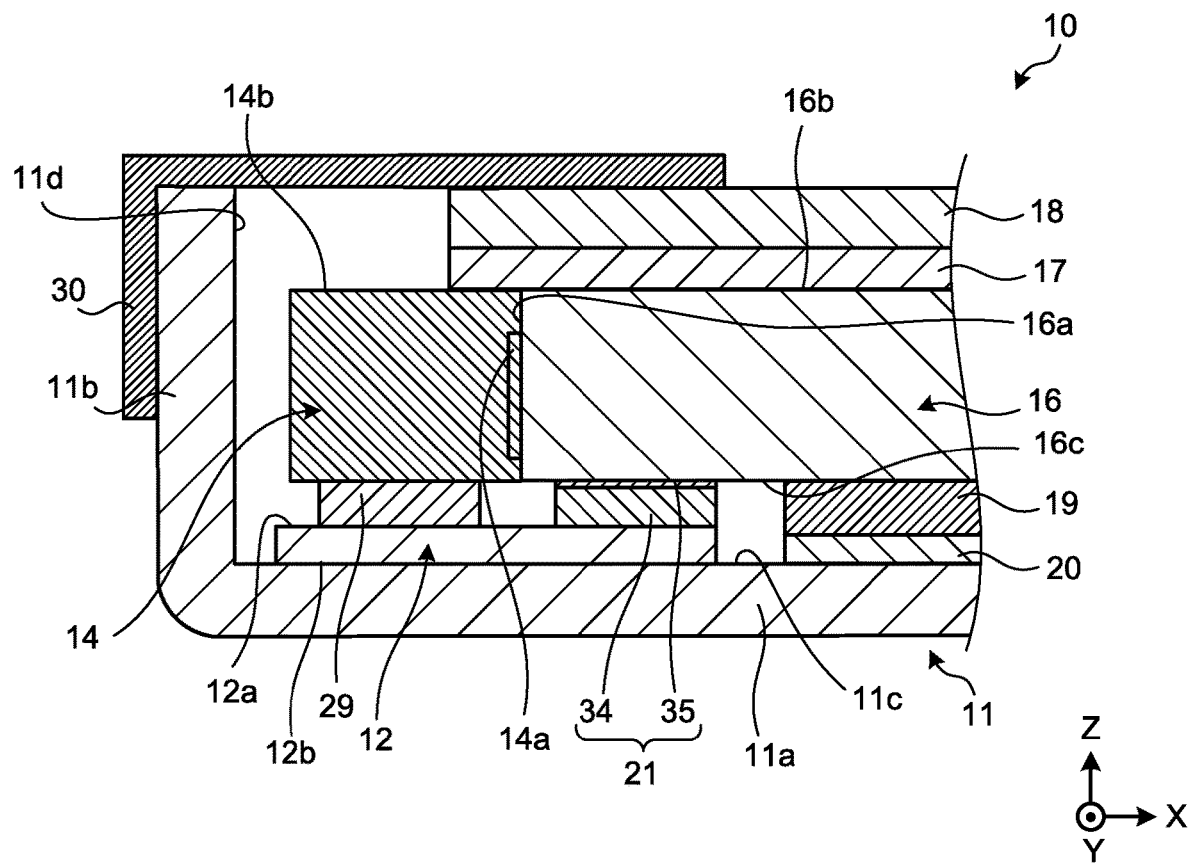
FIG. 14 is yet another example cross-sectional view taken along line A-A in FIG. 1.
Figure 15:
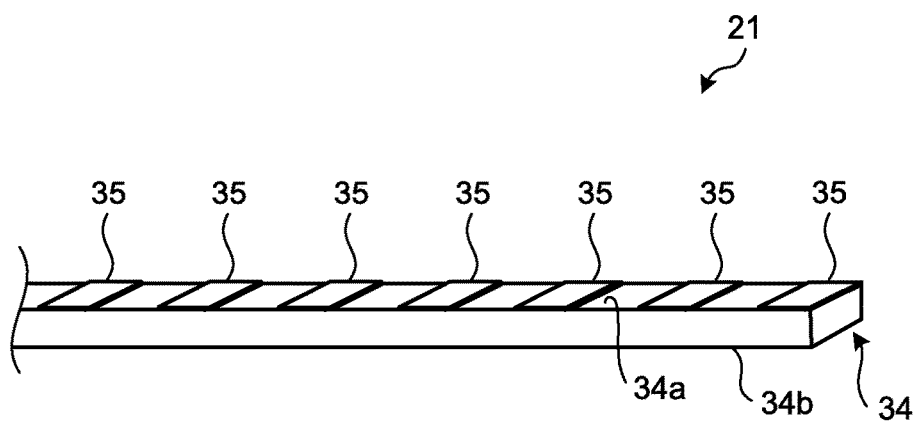
FIG. 15 is a diagram illustrating an example structure of a fixing member in FIG. 14.

FIG. 14 is yet another example cross-sectional view taken along line A-A in FIG. 1. FIG. 14 illustrates another example configuration of the planar lighting device 10 illustrated in FIG. 1 including side-view LEDs. FIG. 15 is a diagram illustrating an example structure of the fixing member in FIG. 14. As illustrated in FIG. 14, a strip-shaped fixing member 21 is adhered to a region on the main surface 16c of the light guide plate 16 closer to the LEDs 14 to fix the light guide plate 16 to the bottom surface 11c of the frame 11.

As illustrated in FIG. 15, the fixing member 21 includes a fixing body 34 and a plurality of non-adhesive members 35. The fixing body 34 is a heat active member activated at low temperatures (e.g., 80 to 100° C.). A first surface 34a of the fixing body 34 is adhered to the main surface 16c of the light guide plate 16 by, for example, thermocompression bonding, and a second surface 34b of the fixing body 34 is adhered to the bottom surface 11c of the frame 11 by, for example, thermocompression bonding.

The fixing body 34 is, for example, a heat active double-sided adhesive tape. The heat active double-sided adhesive tape is, for example, a heat active double-sided adhesive film made of low-temperature heat active adhesive with no substrate, a tape made of polyurethane-coated paper or a polyethylene-coated paper to which a low-temperature heat active adhesive is applied, or a tape made of acrylic non-woven fabric to which a low-temperature heat active adhesive is applied. The heat active member may be a thermosetting member or a thermoplastic member. The fixing body 34 may be an elastomer. The elastomer is, for example, a thermosetting elastomer such as a thermosetting resin elastomer, or a thermoplastic elastomer.

The non-adhesive members 35 are disposed on the first surface 34a of the fixing body 34 and are spaced apart from each other in the longitudinal direction of the fixing body 34. The non-adhesive members 35 are an example of non-adhesive portions not adhering to the main surface 16c of the light guide plate 16. The non-adhesive members 35 are made of resin. The non-adhesive members 35 are plate members made of, for example, PET, acryl, polyester, polyimide, or polyvinyl chloride. The non-adhesive members 35 may be formed by, for example, printing on the first surface 34a of the fixing body 34. In this case, the non-adhesive members 35 are formed by printed ink droplets made of, for example, resin such as, for example, PET, acryl, polyester, polyimide, or polyvinyl chloride and white pigment.

The non-adhesive members 35 of the fixing member 21 are disposed at regions of the main surface 16c of the light guide plate 16 facing the first regions 16d on the main surface 16b (see FIG. 6) and the first surface 34a of the fixing body 34 is adhered to the second regions 16e on the main surface 16b (see FIG. 6) of the light guide plate 16. This configuration provides an air layer between the non-adhesive members 35 and the first regions 16d of the light guide plate 16, thereby preventing emission of light from the main surface 16c of the light guide plate 16 and preventing reduction in brightness of the planar lighting device 10.

The planar lighting device 10 illustrated in FIG. 14 can prevent reduction in brightness by including the fixing member 21. Although the planar lighting device 10 illustrated in FIG. 14 includes no sticker member 22 adhered to the main surface 16b of the light guide plate 16, the planar lighting device 10 may include the sticker member 22 illustrated in FIG. 2 adhered to the main surface 16b of the light guide plate 16.

Figure 16:
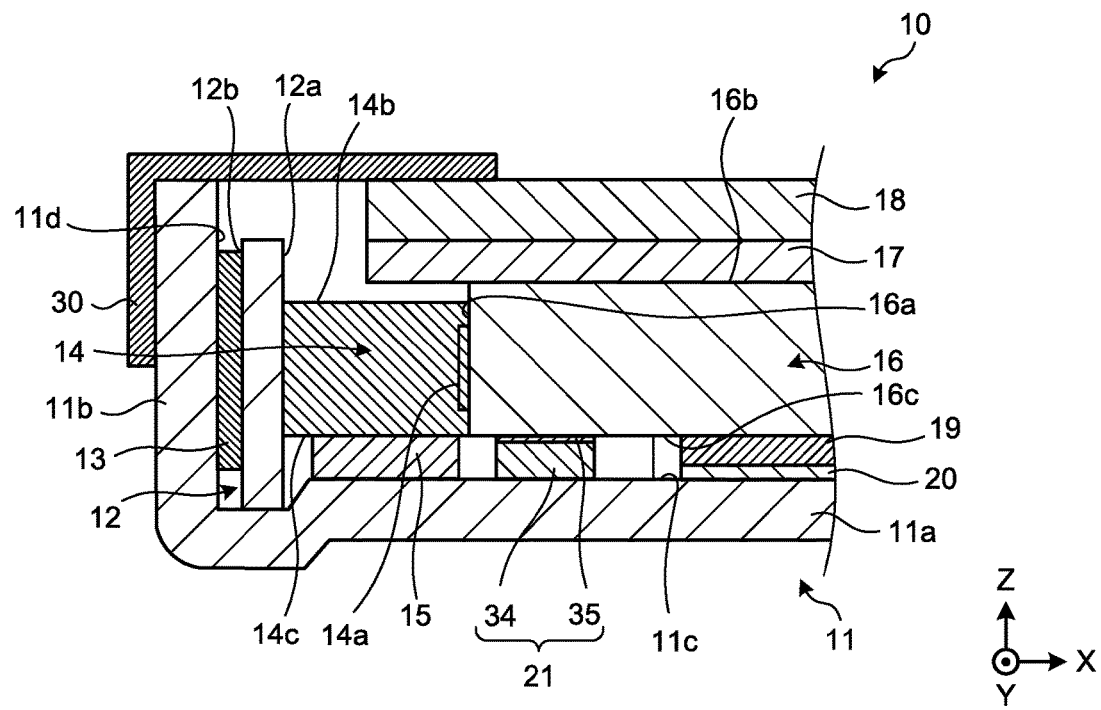
FIG. 16 is still another example cross-sectional view taken along line A-A in FIG. 1.

FIG. 16 is still another example cross-sectional view taken along line A-A in FIG. 1. FIG. 16 illustrates still another example configuration of the planar lighting device 10 illustrated in FIG. 1 including top-view LEDs. As illustrated in FIG. 16, a strip-shaped fixing member 21 is adhered to a region on the main surface 16c of the light guide plate 16 closer to the LEDs 14 to fix the light guide plate 16 to the bottom surface 11c of the frame 11. The fixing member 21 has the configuration illustrated in FIG. 15. The fixing body 34 of the fixing member 21 has the first surface 34a adhered to the main surface 16c of the light guide plate 16 by, for example, thermocompression bonding and the second surface 34b adhered to the bottom surface 11c of the frame 11 by, for example, thermocompression bonding.

The non-adhesive members 35 of the fixing member 21 in FIG. 16 are disposed at regions of the main surface 16c of the light guide plate 16 facing the first regions 16d on the main surface 16b (see FIG. 6) and the first surface 34a of the fixing body 34 is adhered to the second regions 16e on the main surface 16b (see FIG. 6) of the light guide plate 16. This configuration provides an air layer between the non-adhesive members 35 and the first regions 16d of the light guide plate 16, thereby preventing emission of light from the main surface 16c of the light guide plate 16 and preventing reduction in brightness of the planar lighting device 10. Although the planar lighting device 10 illustrated in FIG. 16 includes no sticker member 22 adhered to the main surface 16b of the light guide plate 16, the planar lighting device 10 may include the sticker member 22 illustrated in FIG. 10 adhered to the main surface 16b of the light guide plate 16.

Figure 17:
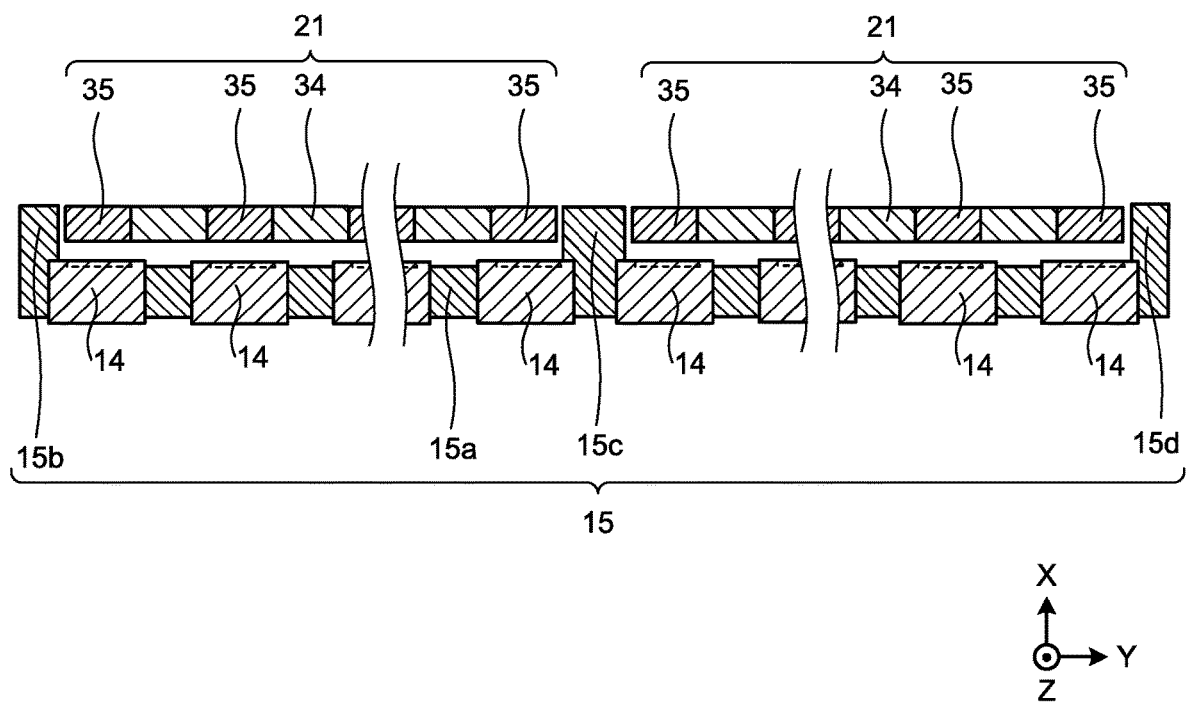
FIG. 17 is a plan view illustrating a relation between LEDs, a connecting member, fixing members, and non-adhesive members of the planar lighting device in FIG. 16.

FIG. 17 is a plan view illustrating the relation between the LEDs 14, the connecting member 15, the fixing body 34, and the non-adhesive members 35 of the planar lighting device in FIG. 16. Components other than the LEDs 14, the connecting member 15, the fixing body 34, and the non-adhesive members 35 are not illustrated in FIG. 17. In FIG. 17, for ease of discussion, the LEDs 14, the connecting member 15, the fixing body 34, and the non-adhesive members 35 are hatched with lines so that they can be easily distinguished from each other. As illustrated in FIG. 17, two fixing members 21, each including the fixing body 34 and the non-adhesive members 35, are disposed in the direction (Y-axis direction) in which the LEDs 14 are arranged.

The connecting member 15 extends in the direction (Y-axis direction) in which the LEDs 14 are arranged. The connecting member 15 includes a light-source adhering portion 15a adhered to the lower surfaces 14c (see FIG. 16) of the LEDs 14 and light guide plate adhering portions 15b, 15c, and 15d extending along the bottom surface 11c (see FIG. 16) of the frame 11 and in a direction (in the positive direction of the X-axis) from the light-source adhering portion 15a toward the light guide plate 16 (not illustrated).

One of the two fixing members 21 is disposed between the light guide plate adhering portions 15b and 15c in the direction (Y-axis direction) in which the LEDs 14 are arranged and the other one of the two fixing members 21 is disposed between the light guide plate adhering portions 15c and 15d in the direction (Y-axis direction) in which the LEDs 14 are arranged. The connecting member 15 includes the light guide plate adhering portions 15b, 15c, and 15d projecting from the light-source adhering portion 15a in a direction (positive direction of the X-axis) toward the light guide plate (not illustrated) to the positions facing end portions (opposite ends in the longitudinal direction) of the fixing members 21.

The light guide plate 16 is adhered to the connecting member 15 in the same manner as the LEDs 14, and this configuration allows the main surface 16c of the light guide plate 16 to be positioned at the same height level as the lower surfaces 14c of the LEDs 14 in a direction (Z-axis direction) orthogonal to the bottom surface 11c of the frame 11. This configuration can align the optical axis of the LEDs 14 with the optical axis of the light guide plate 16. If the connecting member 15 and the fixing member 21 have a different thickness, the light guide plate 16 can be disposed to be aligned with the optical axis of the LEDs 14 in the Z-axis direction by providing a slightly larger thickness to the fixing member 21 that can be elastically deformed. Although two fixing members 21 are arranged in the example in FIG. 17, one or three or more fixing members 21 may be arranged by, for example, adjusting the number of light guide plate adhering portions 15c disposed in the center portion (except the opposite ends) of the connecting member 15.

Although the LEDs 14 are mounted to the FPC 12 individually in the examples above, an integrated LED unit including a plurality of LEDs 14 may be mounted to the FPC 12. In the embodiment above, the LEDs 14 are described as an example of light sources, but the light sources are not limited to the LEDs 14 and other point light sources may be used. If a single LED has two or more separate light emitting surfaces in its longitudinal direction (Y-axis direction), the LED can be considered to have as many light sources as the light emitting surfaces.

As described above, the planar lighting device 10 according to the embodiment includes the light guide plate 16, the LEDs 14 (an example of the light sources), the sticker member 22 (an example of the strip-shaped member), and the fixing member 21 (an example of the strip-shaped member). The light guide plate 16 has the side surface 16a and the two main surfaces 16b and 16c. The main surface 16b of the two main surfaces 16b and 16c emits light entered from the side surface 16a. The LEDs 14 face the side surface 16a and are arranged in the longitudinal direction (Y-axis direction) of the side surface 16a. The LEDs 14 emit light that enters the side surface 16a. The sticker member 22 and the fixing member 21 extend in the longitudinal direction (Y-axis direction) of the side surface 16a and are adhered to the second regions 16e on the corresponding main surface of the two main surfaces 16b and 16c closer to the LEDs 14. The sticker member 22 and the fixing member 21 include non-adhesive portions (e.g., the substrates 24a of the adhesive members 24, the non-adhesive members 25, the non-adhesive members 27, and the non-adhesive members 33 and 35) disposed at positions facing the first regions 16d on a corresponding main surface of the two main surfaces 16b and 16c in front of the LEDs 14. The non-adhesive portions do not adhere to the light guide plate 16. This structure can prevent reduction in brightness of the planar lighting device 10. The planar lighting device 10 may exclude the sticker member 22 or may exclude the non-adhesive portions of the fixing member 21.

The sticker member 22 is a lightproof strip-shaped member. This configuration can reduce the area of uneven brightness (hot spot) in front of the LEDs 14 compared to when a comb-shaped sticker member having cut-out portions located in front of the LEDs 14 is used instead of the sticker member 22, or when the sticker member 22 has no lightproof properties, which in turn allows the planar lighting device 10 to have a narrower frame.

The sticker member 22 includes the adhesive member 23 (an example of an adhesive tape) including the lightproof substrate 23a and the adhesive layer 23b adhered to the main surface 16b of the light guide plate 16. In this regard, the substrate 23a of the adhesive member 23 is adhered to at least one of the two main surfaces 16b and 16c. The adhesive member 23 can have a function of adhering to the light guide plate 16 and a function of a light-shielding property with such a simple structure.

The sticker member 22 is disposed over both of at least one of the two main surfaces 16b and 16c of the light guide plate 16 and the LEDs 14. If light leaks from a gap between the LEDs 14 and the light guide plate 16 or from the package of the LEDs 14 in the upward direction (in the positive direction of the Z-axis), the sticker member 22 can prevent such leaking light from entering the diffusion sheet 17 and the prism sheet 18.

The non-adhesive portions are the substrate 24a of the adhesive members 24 (an example of single-sided adhesive tapes) including the substrate 24a and the adhesive layer 24b. The adhesive layer 24b of the adhesive member 24 is adhered to the adhesive layer 23b of the sticker member 22. The non-adhesive portions can be easily formed in this manner.

The sticker member 22 includes, in addition to the adhesive member 23 (an example of a first adhesive tape), the adhesive member 26 (an example of a second adhesive tape) including the adhesive layer 26b adhered to a surface of the substrate 23a of the adhesive member 23 opposite to the adhesive layer 23b and the lightproof substrate 26a. The adhesive member 23 has the cut-out portions 23c located at positions facing the first regions 16d. The non-adhesive members 25 that are the non-adhesive portions are disposed at the cut-out portions 23c and adhered to the adhesive layer 26b of the adhesive member 26. The non-adhesive members 25 have no adhesiveness. This configuration, for example, can form the non-adhesive portions at positions coplanar with or not protruding from the plane including the adhesive layer 23b of the adhesive member 23. With this structure, the adhesive layer 23b can be more accurately adhered to the light guide plate 16.

The non-adhesive members 27 that are the non-adhesive portions are printed on the adhesive layer 23b of the adhesive member 23. The non-adhesive portions can be easily formed in this manner.

The sticker member 22 adhered to at least one of the two main surfaces 16b and 16c of the light guide plate 16 is additionally adhered to the LEDs 14. This structure can more firmly fix the LEDs 14 to the light guide plate 16.

The fixing member 21 includes the strip-shaped fixing body 34 having the first surface 34a on which the non-adhesive members 35 that are the non-adhesive portions are disposed. The non-adhesive members 35 are spaced apart from each other in the longitudinal direction of the side surface 16a. The first surface 34a is adhered to the main surface 16c of the light guide plate 16. This configuration prevents emission of light from the main surface 16c of the light guide plate 16, thereby preventing reduction in brightness of the planar lighting device 10.

The second surface 34b of the fixing body 34 opposite to the first surface 34a on which the non-adhesive members 35 are disposed is adhered to the frame 11. This structure can fix the light guide plate 16 to the frame 11 while preventing reduction in brightness of the planar lighting device 10.

The planar lighting device 10 includes the connecting member 15 extending in the longitudinal direction of the side surface 16a of the light guide plate 16 and having the light-source adhering portion 15a adhered to the lower surfaces 14c, which are on the frame 11 side, of the LEDs 14. The connecting member 15 has at least one of the light guide plate adhering portions 15b, 15c, 15d extending from the light-source adhering portion 15a to a region facing an end of the fixing body 34 in the longitudinal direction of the side surface 16a of the light guide plate 16. This configuration can easily align the optical axis of the LEDs 14 with the optical axis of the light guide plate 16.

A plurality of the fixing bodies 34 are aligned in the longitudinal direction of the side surface 16a of the light guide plate 16. The light guide plate adhering portions 15b, 15c, and 15d extend from the light-source adhering portion 15a to the regions facing a corresponding end of the fixing bodies 34 in the longitudinal direction of the side surface 16a of the light guide plate 16. This configuration can more accurately align the optical axis of the LEDs 14 with the optical axis of the light guide plate 16.

According to an embodiment of the present invention, a planar lighting device that can prevent reduction in brightness can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
    a light guide plate having a side surface and two main surfaces, one of the two main surfaces emitting light entered from the side surface;
    a plurality of light sources facing the side surface and arranged in a longitudinal direction of the side surface, the light sources being configured to emit light that enters the side surface; and
    a strip-shaped member extending in the longitudinal direction of the side surface and adhered to a region on at least one of the two main surfaces, the region being closer to the light sources, wherein
    the strip-shaped member includes non-adhesive portions disposed at positions facing regions of the at least one of the two main surfaces, the regions being in front of each of the light sources, the non-adhesive portions not adhering to the light guide plate, and,
    the strip-shaped member further includes a strip-shaped fixing body having a surface on which the non-adhesive portions are disposed, the non-adhesive portions being spaced apart from each other in the longitudinal direction of the side surface, the surface being adhered to the at least one of the two main surfaces.

2. The planar lighting device according to claim 1, wherein the non-adhesive portions are non-adhesive substrates adhered to the strip-shaped member.

3. The planar lighting device according to claim 1, wherein the non-adhesive portions are non-adhesive members printed on the strip-shaped member.

4. The planar lighting device according to claim 1, wherein the strip-shaped member includes an adhesive tape including an adhesive layer and a substrate, the adhesive layer of the adhesive tape being adhered to the at least one of the two main surfaces.

5. The planar lighting device according to claim 1, wherein the strip-shaped member has a light-shielding property.

6. The planar lighting device according to claim 1, wherein each of the strip-shaped member is disposed over both of the at least one of the two main surfaces of the light guide plate and the light sources.

7. The planar lighting device according to claim 1, wherein the strip-shaped member adhered to the at least one of the two main surfaces of the light guide plate is further adhered to the light sources.

8. A planar lighting device comprising:
    a light guide plate having a side surface and two main surfaces, one of the two main surfaces emitting light entered from the side surface;
    a plurality of light sources facing the side surface and arranged in a longitudinal direction of the side surface, the light sources being configured to emit light that enters the side surface; and
    a strip-shaped member extending in the longitudinal direction of the side surface and adhered to a region on at least one of the two main surfaces, the region being closer to the light sources, wherein
    the strip-shaped member includes non-adhesive portions disposed at positions facing regions of the at least one of the two main surfaces, the regions being in front of each of the light sources, the non-adhesive portions not adhering to the light guide plate, and the strip-shaped member includes a first adhesive tape adhered to the at least one of the two main surfaces, the first adhesive tape has cut-out portions disposed at positions facing the regions in front of each of the light sources, and the non-adhesive portions are non-adhesive members disposed at the cut-out portions.

9. A planar lighting device comprising:

a light guide plate having a side surface and two main surfaces, one of the two main surfaces emitting light entered from the side surface;

a plurality of light sources facing the side surface and arranged in a longitudinal direction of the side surface, the light sources being configured to emit light that enters the side surface; and a strip-shaped member extending in the longitudinal direction of the side surface and adhered to a region on at least one of the two main surfaces, the region being closer to the light sources, wherein the strip-shaped member includes non-adhesive portions disposed at positions facing regions of the at least one of the two main surfaces, the regions being in front of each of the light sources, the non-adhesive portions not adhering to the light guide plate, and the strip-shaped member is adhered to a back surface that is opposite to the one of the two main surfaces that emits light, the planar lighting device further comprises a connecting member extending in the longitudinal direction of the side surface, the connecting member having a light-source adhering portion adhered to the light sources at a side facing the back surface, and the connecting member has a light guide plate adhering portion extending from the light-source adhering portion disposed at a region facing an end of the strip-shaped member in the longitudinal direction of the side surface.

10. The planar lighting device according to claim 8, wherein the non-adhesive portions are non-adhesive substrates adhered to the strip-shaped member.

11. The planar lighting device according to claim 8, wherein the non-adhesive portions are non-adhesive members printed on the strip-shaped member.

12. The planar lighting device according to claim 8, wherein the strip-shaped member has a light-shielding property.

13. The planar lighting device according to claim 8, wherein each of the strip-shaped member is disposed over both of the at least one of the two main surfaces of the light guide plate and the light sources.

14. The planar lighting device according to claim 8, wherein the strip-shaped member adhered to the at least one of the two main surfaces of the light guide plate is further adhered to the light sources.

15. The planar lighting device according to claim 9, wherein the non-adhesive portions are non-adhesive substrates adhered to the strip-shaped member.

16. The planar lighting device according to claim 9, wherein the non-adhesive portions are non-adhesive members printed on the strip-shaped member.

17. The planar lighting device according to claim 9, wherein the strip-shaped member includes an adhesive tape including an adhesive layer and a substrate, the adhesive layer of the adhesive tape being adhered to the at least one of the two main surfaces.

18. The planar lighting device according to claim 9, wherein the strip-shaped member has a light-shielding property.

19. The planar lighting device according to claim 9, wherein each of the strip-shaped member is disposed over both of the at least one of the two main surfaces of the light guide plate and the light sources.

20. The planar lighting device according to claim 9, wherein a plurality of the strip-shaped members are arranged in the longitudinal direction of the side surface.

\* \* \* \* \*